United States Patent [19]
Webster

[11] 4,322,465
[45] Mar. 30, 1982

[54] CLEAR, AUTOCLAVABLE, SEALED CONTAINER HAVING GOOD WATER VAPOR BARRIER PROPERTIES AND FLEX CRACK RESISTANCE

[75] Inventor: R. Daniel Webster, Wauconda, Ill.

[73] Assignee: Baxter Travenol Laboratories, Inc., Deerfield, Ill.

[21] Appl. No.: 176,616

[22] Filed: Aug. 8, 1980

[51] Int. Cl.³ .............. B32B 3/02; B32B 7/04; B65B 47/00
[52] U.S. Cl. .................... 428/194; 53/453; 206/484; 206/484.2; 428/476.9; 428/483; 428/516; 428/910
[58] Field of Search ............ 428/194, 35, 476.9, 428/483, 516, 192, 910; 206/484, 484.2; 53/453

[56] References Cited

U.S. PATENT DOCUMENTS

| | | | |
|---|---|---|---|
| 4,085,244 | 4/1978 | Stillman | 428/192 |
| 4,169,910 | 10/1979 | Graboski | 428/516 |
| 4,210,686 | 7/1980 | Gajewski et al. | 428/516 |
| 4,211,825 | 7/1980 | Shipman | 428/516 |
| 4,223,512 | 9/1980 | Buchner | 53/453 |
| 4,225,644 | 9/1980 | Tsuchiya et al. | 428/516 |
| 4,229,927 | 10/1980 | Day | 53/453 |
| 4,259,412 | 3/1981 | Buzio et al. | 428/516 |
| 4,275,119 | 6/1981 | Weiner | 428/516 |
| 4,276,330 | 6/1981 | Stanley et al. | 206/484 |
| 4,284,672 | 8/1981 | Stillman | 428/476.9 |

Primary Examiner—William J. Van Balen
Attorney, Agent, or Firm—Paul C. Flattery; John P. Kirby, Jr.; John A. Caruso

[57] ABSTRACT

A clear, flexible, sealed container may be made of first and second plastic sheets sealed together at their peripheries. The first plastic sheet defines a bulge to increase the inside volume of the container, and comprises a laminate of a layer of polyolefin and a blended layer of polyolefin and a block copolymer of polyolefin and polystyrene. The second plastic sheet is a bonded laminate of a layer of biaxially oriented polypropylene and nonoriented polypropylene, peripherally bonded to the layer of polyolefin of the first plastic sheet.

25 Claims, 3 Drawing Figures

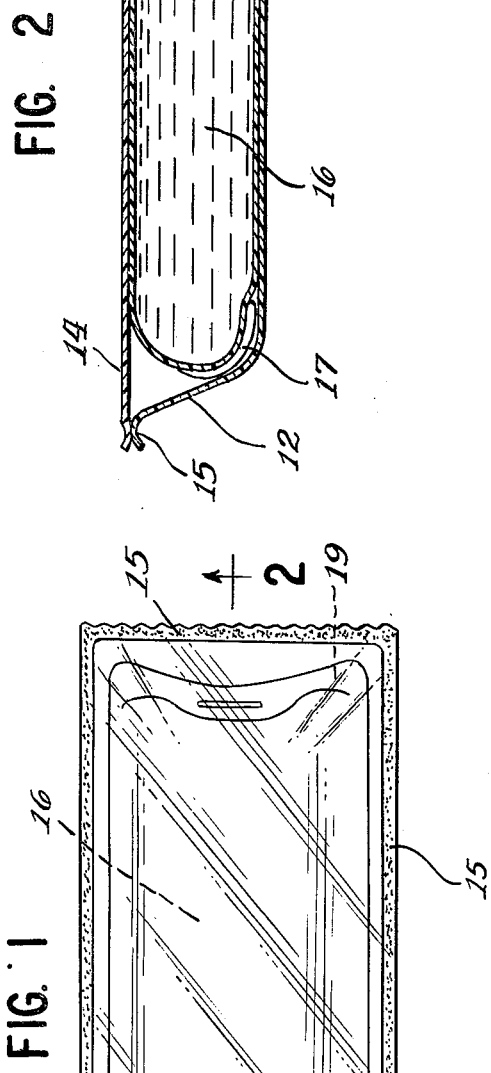
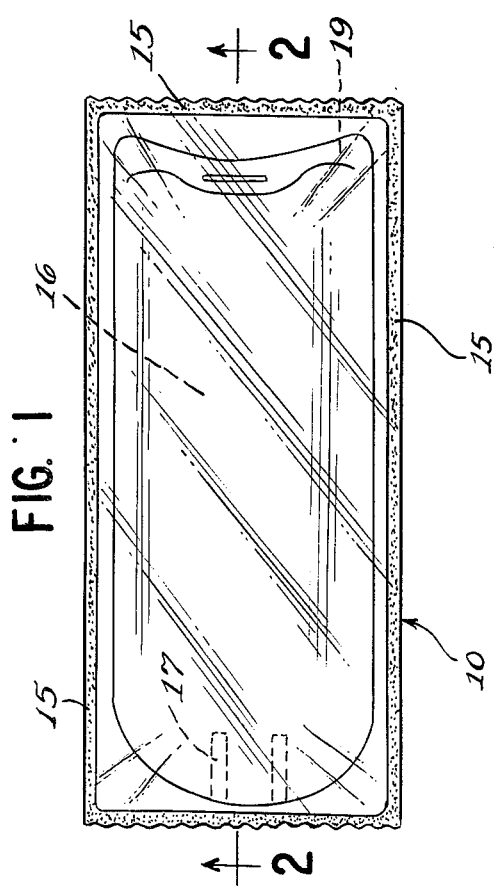
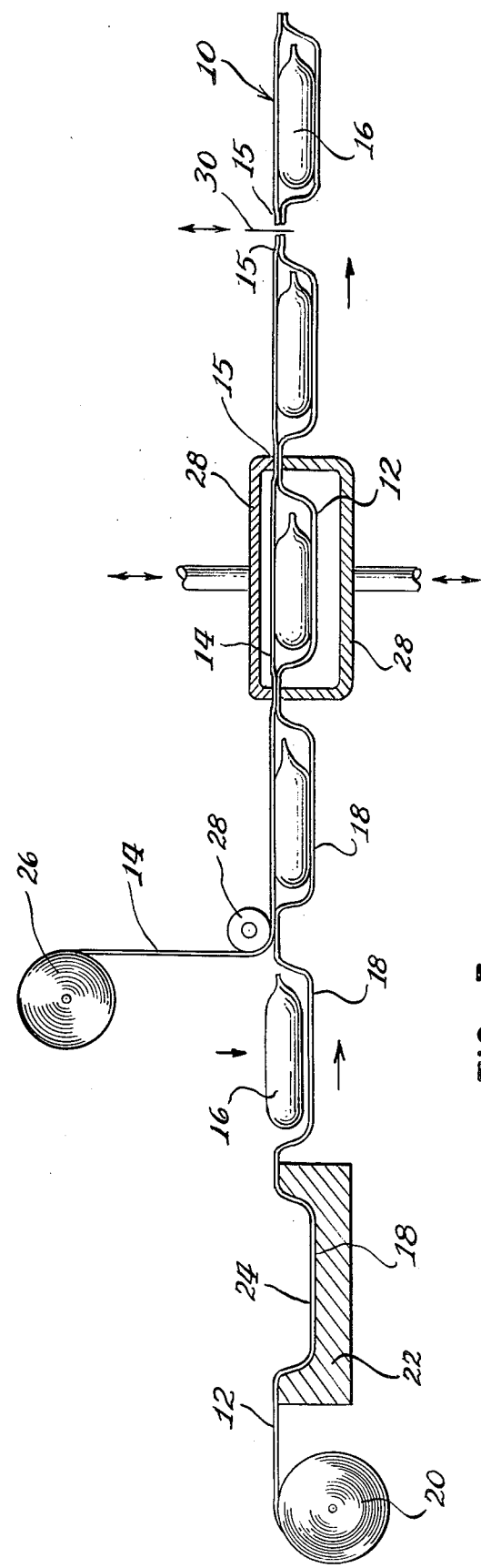

CLEAR, AUTOCLAVABLE, SEALED CONTAINER HAVING GOOD WATER VAPOR BARRIER PROPERTIES AND FLEX CRACK RESISTANCE

BACKGROUND OF THE INVENTION

This application relates most specifically to improved overpouches typically for parenteral solution containers or other medical items as may be desired.

Currently, some parenteral solution containers are made of polyvinyl chloride, being enclosed in a modified polyethylene overpouch to reduce water loss from the solution container by permeation during long-term storage, since the overpouch provides a good vapor barrier.

The above overpouch is transparent, but noticeably milky and not crystal clear. Although the solution container can be easily viewed through the overpouch, it is deemed desirable by some sources, particularly in some foreign countries, to have an overpouch for parenteral solution containers which is crystal clear, and yet which provides the desired autoclavability, good water vapor barrier properties and good overall physical integrity.

Furthermore, it would be desirable to increase the inside volume of the overpouch by preforming a bulge in one of the sheet faces of the overpouch by a thermoforming process or the like. This is not easily accomplished with polypropylene sheeting, particularly biaxially oriented polypropylene sheeting which has the desirable clarity and strength.

In Gajewski et al. U.S. Pat. No. 4,210,686, a multilayered plastic sheeting is disclosed having high clarity, strength, and resistance to water vapor transmission. However, the sheet material at the desirable thin grade used for the production of flexible overpouches can exhibit difficulties during heat sealing operations on an automated basis. The heat seal dies can easily melt through the heat seals when the multiple layers of the plastic sheeting all have similar melting points. Accordingly, while the material of the above cited patent can be readily heat sealed to form containers, it is a fairly critical operation which is difficult to maintain in automated equipment such as a horizontal form-fill machine, where laminated materials of substantially different melting points are preferred for heat sealing.

In accordance with this invention, a new laminated container structure is provided, which preferably is utilized as an overpouch for a medical container or the like, in which the opposed sides of the overpouch, peripherally sealed about their edges, constitute differing, preferably laminated materials, each of which provide unique advantages to the entire system to obtain a superior container product of essentially optically clear transparency, good flexibility, good heat sealing and water vapor barrier properties, and high flex crack resistance. The container of this invention may also be a primary container for liquids or the like if desired.

DESCRIPTION OF THE INVENTION

By this invention a clear, autoclavable, flexible sealed container, having good water vapor barrier properties, heat sealability, and flex crack resistance is provided. The container is made of first and second plastic sheets sealed together at their peripheries. The first plastic sheet defines a bulge to increase the inside volume of the container, and comprises a laminate of (1) at least one layer of a polyolefin derived principally from propylene (or ethylene) and being of semi-crystalline characteristic to exhibit a low permeability to water vapor, bonded to (2) a blended layer consisting essentially of 30 to 90 percent by weight of a block copolymer having thermoplastic, rubbery characteristics, and having rubbery polyolefin blocks consisting essentially of ethylene and butylene units and blocks of a polystyrene; the rubbery polyolefin blocks comprising from 60 to 85 percent by weight of said block copolymer; and from 10 to 70 percent by weight of a polyolefin derived principally from at least one of propylene, ethylene, and 4-methylpentene-1, said polyolefins having Vicat softening temperatures of above 120° C.

The second plastic sheet comprises a bonded laminate comprising a layer of relatively nonoriented polypropylene and a layer of biaxially oriented polypropylene, said nonoriented polypropylene being peripherally bonded to said layer of polyolefin of the first plastic sheet. Alternatively, the second plastic sheet may be a laminate of polypropylene for heat sealing, optionally including a layer of metal foil such as aluminum foil as a vapor barrier, and biaxially oriented polyester to serve as a support during heat sealing. Furthermore, if ingredient (1) above is primarily polyethylene, the nonoriented polypropylene may be substituted with polyethylene.

Alternatively, the first plastic sheet may comprise a laminate of (1) at least one layer of a polyolefin derived principally from at least one of propylene, ethylene and 4-methylpentene-1, and being of semi-crystalline characteristic to exhibit a low permeability to water vapor, bonded to (2) a layer selected from the group consisting of flexible nylon and polyester materials to impart crack resistance to the first plastic sheet. An adhesive bonding technique may be used.

The container of this application may be made by first thermoforming a convex bulge into the first plastic sheet to increase the inside volume of the container to be formed, taking advantage of the good thermoforming properties of the material.

Thereafter, the object to be enclosed, for example a 1 liter bag of parenteral solution, may be placed into the interior of the convex bulge defined by the thermoformed plastic sheet.

After this, the first plastic sheet and the object may be overlaid with a second plastic sheet as described above of the relatively nonoriented polypropylene laminated to a layer of biaxially oriented polypropylene. The first and second layers are then peripherally heat sealed together about the convex bulge and the object, to form a sealed container.

The biaxially oriented polypropylene, as is known in heat sealing technology, has a higher melting temperature than the nonoriented polypropylene and accordingly greatly facilitates the heat sealing operation, since it is slower to melt than the other layers being heat sealed to it and provides a continuing structural support during the heat sealing operation. Accordingly, an improved, heat sealed composite container may be more easily formed in accordance with this invention, while at the same time advantage may be taken of the good thermoforming characteristics of the first plastic layer to form the convex bulge for increasing the inside volume of the container. After sealing the second plastic sheet crosses over the mouth of the convex bulge in generally flat configuration when in its original, unstressed position.

The polyolefin of ingredient (2) as described above is preferably principally polypropylene.

It is further generally preferred for the first plastic sheet to comprise a three-layered laminate, with the inner layer being the blended layer as described above, and the two outer layers positioned on each side of the blended layer being layers of polyolefin, preferably being predominately polypropylene.

The first layer is preferably thermoformed to form a convex bulge in which the maximum depth of the bulge, relative to the plane of the peripheral, sealed area in the final container, is at least 60 mm. This permits the container to enclose a normally-sized 1 liter bag of solution.

Accordingly, a container of improved clarity, yet which retains autoclavability, good water vapor barrier properties, and good flex crack resistance, among other improvements, is provided in accordance with this invention. The container is capable of carrying the enlarged, thermoformed convex bulge described above.

The first plastic sheet may be made in accordance with the patent application cited above. A block copolymer as described in ingredient (2) is commercially available under the trademark KRATON G from the Shell Chemical Company. The block copolymer materials preferably used herein have a Brookfield viscosity of 10 to 2000 cps., as a ten weight percent toluene solution, measured at 25° C.

Preferably, in the block copolymer described above, the central block of poly(ethylene-butylene) units may comprise 60 to 85 percent by weight of the copolymer molecule, while the terminal blocks of polystyrene or equivalent material comprise the balance of the compound. The polyolefin is used in conjunction with the block copolymer to increase the heat distortion temperature of the resulting formulation, to assist in withstanding autoclaving temperatures.

The polyolefin components herein may each or all include minor amounts of other olefin polymer units as may be desired. For example, a polypropylene formulation may contain about 3 percent of ethylene units. Also, other minor amounts of olefins may be added as desired, for example, butadiene, isoprene, isobutylene, 1-butene, 1-hexene, or the like, as well as small amounts of cross-linking units such as divinylbenezene, vinyl cyclohexene, or 1,5 hexadiene, to increase the molecular weight of the resulting cured material. In particular, the one layer of polyolefin of the first plastic sheet may comprise a high density polyethylene formulation containing from 20 to 40 percent by weight of polyisobutylene rubber, to toughen and soften the high density polyethylene.

The term "high density polyethylene" is intended to define a polyethylene formulation which has a density of 0.95 gram per cc. or more.

Preferably, the first plastic sheet may comprise essentially 75 to 85 percent by weight of the block copolymer described above in which the ethylene and butylene units are preferably in generally equal proportions. The block copolymer then is an intimate mixture with from 15 to 25 percent by weight of a polypropylene containing a minor amount of ethylene units, for example, about 3 percent.

The one layer of polyolefin of the first plastic sheet may then also be a polypropylene containing a minor amount, for example about 3 weight percent, of ethylene units with such layers of polyolefin being positioned on one or both sides of the blended layer containing the block copolymer. Also, if desired, the polyolefin components of the first plastic sheet may include copolymers of ethylene containing up to about 35 percent by weight of vinyl acetate units, with the copolymers of ethylene having a melt flow index (ASTM D1238, Condition E) of about 0.1 to 50.

The blended layer of the first plastic sheet may also be substituted by a layer of flexible nylon or polyester material, for example polyethylene terephthalate, or the reaction product of adipic acid or terephthalic acid and hexamethylene diamine. Such materials may be used in a manner similar to that previously described to provide a first plastic sheet which may be of three layers, with the nylon or polyester layer comprising the internal layer and bracketed with polyolefin layers, to provide a container of analogous structure. Similarly, the biaxially oriented polyester optionally used in the second plastic sheet may be commercially available polyethylene terephthalate.

The convex bulge, perferably of at least 60 mm. depth, is formed, and the sheet is heat sealed to the second plastic sheet as previously described in this invention, to enclose a 1 liter bag of solution or other article as may be desired. Alternatively, other size bags may be enclosed as well.

The containers of this invention exhibit less pin hole formation because of their good flex crack resistance, as well as having the other advantages as described above.

Preferably, the blended layer of the first plastic sheet may have thickness of about 0.002 inch, being bracketed with outside layers consisting essentially of polypropylene containing a few percent (about 3 percent by weight) of ethylene units, which outside layers may be about 0.003 inch thick each, to provide the laminated sheet material to form one wall of the container of this invention.

The second plastic sheet, heat sealed to the first layer, may be a commercially available polypropylene adhesive laminate, for example Moplefan OT/GT 35/50 sold by the Montedison group. The biaxially oriented polypropylene layer may be 0.0014 inch thick, while the nonoriented layer may be 0.002 inch thick.

The Vicat softening temperature defined above may be determined according to ASTM D1525.

In the drawings

FIG. 1 is a plan view of the clear, autoclavable, flexible, sealed container of this invention used as an overpouch and containing a conventional plastic parenteral solution bag.

FIG. 2 is a sectional view taken along line 2—2 of FIG. 1.

FIG. 3 is a generally schematic view of a process line for manufacturing the container of FIG. 1, carrying a flexible plastic solution bag, on an automated basis.

Referring to the drawings, container 10 of this invention is made of first plastic sheet 12 and second plastic sheet 14, sealed together by a heat seal 15 at their periphery, and enclosing a flexible plastic parenteral solution bag 16 having folded access ports 17 and sealed end 19. Alternatively, ports 17 may be packed in extended condition.

As shown in FIG. 2, the first plastic sheet 12 defines a bulge 18 which may be preferably formed by a conventional thermoforming process or the like, to increase the inside volume of the container. As shown, second plastic sheet 14 is flatter than the first plastic sheet, although it may also define a slight bulge if desired, with the peripheral heat seal 15 of the container being positioned nearer to the general plane of the second sheet 14 than the first sheet 12, as shown in FIG. 2.

The first and second plastic sheets may be formulated of materials as described previously. Preferably, the first plastic sheet 12 comprises a three-layer composite in which the middle or inner layer is a blend of 20 weight percent polypropylene and 80 weight percent of block copolymer as previously described, particularly a copolymer sold by Shell Chemical Company under the trademark KRATON G 1662. The inner layer may have a thickness of about 0.002 inch. Each of the outside layers may be made of polypropylene, and may have a thickness of about 0.003 inch.

The second sheet 14 may be a polypropylene adhesive laminate having a biaxially oriented polypropylene layer about 0.0014 inch thick, and a nonoriented layer about 0.002 inch thick. The nonoriented polypropylene layer faces the first layer 12, and participates in the peripheral heat seal 15. Such a polypropylene adhesive laminate is commercially available from the Montedison group under the trademark Moplefan OT/GT 35/50.

As stated before, the resulting overpouch for a parenteral solution bag is clear, autoclavable, and with good water vapor barrier properties and high flex crack resistance. Also, the peripheral heat seal of the container is strong and durable.

Referring to FIG. 3, a process line for the fabrication of the containers of this invention is shown.

First plastic sheet 12 is advanced off of a roller 20, passing through conventional thermoforming apparatus 22 to form the bulge portion 18 in the first sheet, which is also illustrated in FIG. 2.

The depth of the thermoformed bulge or pouch 24 may be about 74 mm., preferably to permit the retention of the 1 liter container.

Thereafter, as the process line advances, each bulge 18 may be filled with the object which it is intended to enclose, for example a 1 liter bag 16 of parenteral solution.

Following this, as the first plastic sheet 12 advances, second plastic sheet 14 is advanced off of roller 26, passing around guide roller 28 into close, overlying relation with first plastic sheet 12 and each container 16 in each bulge 18.

Thereafter, heat sealing apparatus 28, comprising a conventional peripheral heat sealing means, is utilized to seal first sheet 12 to second sheet 14 about their peripheries to form an enclosed, sealed flexible container. In the preferred instance, the nonoriented polypropylene plastic of second sheet 14 melts and flows into intimate, sealed relation with the plastic material of first sheet 12.

Sealing apparatus 28 may be a Multivac Automatic Roll Stock Machine as sold by Sepp Haggenmueller A.G. of Wolfert-Schwenden, West Germany. Thus, the advantages of automated assembly may be provided to this invention.

Following this, a cutter member 30 may be used to separate newly-formed end heat seals 15 to provide separate overpouches 10, each containing its desired contents such as bag 16 in sterile, sealed relation.

The above has been offered for illustrative purposes only, and is not intended to limit the invention of this application, which is as defined in the claims below.

That which is claimed is:

1. A clear, autoclavable, flexible, sealed container having good water vapor barrier properties and flex crack resistance, said container being made of first and second plastic sheets sealed together at their peripheries, said first plastic sheet comprising a laminate of (1) at least one layer of a polyolefin derived principally from propylene, and being of semi-crystalline characteristic to exhibit a low permeability to water vapor, bonded to (2) a blended layer consisting essentially of 30 to 90 percent by weight of a block copolymer having thermoplastic, rubbery characteristics, and having rubbery polyolefin blocks consisting essentially of ethylene and butylene units, and blocks of a polystyrene; the rubbery polyolefin blocks comprising from 60 to 85 percent by weight of said block copolymer; and from 10 to 70 percent by weight of a polyolefin derived principally from at least one of propylene, ethylene, and 4-methylpentene-1, said polyolefin having a Vicat Softening Temperature of above 120° C.; said second plastic sheet comprising a bonded laminate comprising a layer of relatively nonoriented polypropylene and a layer of biaxially oriented polypropylene, said nonoriented polypropylene being peripherally bonded to said layer of polyolefin of the first plastic sheet.

2. The container of claim 1 in which said first plastic sheet defines a formed bulge to increase the inside volume of the container.

3. The container of claim 2 in which said polyolefin of ingredient (2) of the first plastic sheet is principally polypropylene.

4. The container of claim 3 in which the first plastic sheet comprises a three-layer laminate with the inner layer being said blended layer and the two outer layers each being said layer of polyolefin.

5. The container of claim 4 in which the maximum depth of said bulge, relative to the peripheral sealed area thereof, is at least 60 mm.

6. The container of claim 5 which is sized to enclose a one liter bag of solution.

7. A clear, autoclavable, flexible, sealed container having good water vapor barrier properties and flex crack resistance, said container being made of first and second plastic sheets sealed together at their peripheries, said first plastic sheet comprising a laminate of (1) at least one layer of a polyolefin derived principally from propylene, and being of semicrystalline characteristic to exhibit a low permeability to water vapor, bonded to (2) a layer selected from the group consisting of flexible nylon and polyester materials to impart crack resistance to said first plastic sheet; said second plastic sheet comprising a bonded laminate comprising a layer of relatively nonoriented polypropylene and a layer of biaxially oriented polypropylene, said nonoriented polypropylene being peripherally bonded to said layer of polyolefin of the first plastic sheet.

8. The container of claim 7 in which said first layer defines a formed bulge to increase the inside volume of the container.

9. The container of claim 8 in which said first plastic sheet comprises a three-layer laminate with the two outer layers comprising said layer of polyolefin, and the inner layer comprising said layer selected from the group consisting of nylon and polyester.

10. The container of claim 7 in which the maximum depth of said bulge, relative to the peripheral sealed area of said first sheet, is at least 60 mm.

11. The container of claim 10 which is sized to enclose a one liter bag of solution.

12. The method of enclosing an object into a clear, autoclavable, flexible, sealed container having good water vapor barrier properties and flex crack resistance, which comprises thermoforming a convex bulge into a first plastic sheet to increase the inside volume of the container to be formed, said first plastic sheet comprising a laminate of (1) at least one layer of a polyolefin derived principally from propylene, and being of semi-crystalline characteristic to exhibit a low permeability to water vapor, bonded to (2) a blended layer consisting essentially of 30 to 90 percent by weight of a block copolymer having thermoplastic, rubbery characteristics, and having rubbery polyolefin blocks consisting essentially of ethylene and butylene units, and blocks of a polystyrene; the rubbery polyolefin blocks comprising from 60 to 85 percent by weight of said block copolymer; and from 10 to 70 percent by weight of a polyolefin derived principally from at least one of propylene, ethylene, and 4-methylpentene-1, said polyolefin having a Vicat Softening Temperature of above 120° C.;

placing said object into the convex bulge defined by the thermoformed plastic sheet;

and overlaying said first plastic sheet and said object with a second plastic sheet comprising a bonded laminate comprising a layer of relatively nonoriented polypropylene and a layer of biaxially oriented polypropylene, and peripherally heat sealing said first and second layers together about said convex bulge and object to form a sealed container.

13. The method of claim 12 in which said polyolefin of ingredient (2) of the first sheet is principally polypropylene.

14. The method of claim 12 in which said first plastic sheet comprises a three-layer laminate with the inner layer being said blended layer, and the outer layers each being said layer of polyolefin.

15. The method of claim 12 in which the minimum depth of said bulge, relative to the peripheral sealed area of said first sheet is at least 60 mm.

16. The method of claim 16 in which said object is a one liter bag of solution.

17. The method of enclosing an object into a clear autoclavable, flexible, sealed container having good water vapor barrier properties and flex crack resistance, which comprises thermoforming the convex bulge into a first plastic sheet to increase the inside volume of the container to be formed, said first plastic sheet comprising a laminate of (1) at least one layer of a polyolefin derived principally from propylene and being of semi-cryatalline characteristic to exhibit a low permeability to water vapor, bonded to (2) a layer selected from the group consisting of flexible nylon and polyester materials to impart crack resistance to said first plastic sheet;

placing said object into the convex bulge defined by the thermoformed plastic sheet;

and overlaying said first plastic sheet and said object with a second plastic sheet comprising a bonded laminate comprising a layer of relatively nonoriented polypropylene and a layer of biaxially oriented polypropylene, and peripherally heat sealing said first and second layers together about said convex bulge and object to form a sealed container.

18. The method of claim 17 in which said first plastic sheet comprises a three-layer laminate with the inner layer being said layer selected from the group consisting of flexible nylon and polyester materials, and the outer layers each being principally polypropylene.

19. The method of claim 18 in which the minimum depth of said bulge, relative to the peripheral sealed area of said first sheet, is at least 60 mm.

20. The method of claim 19 in which said object is a one liter bag of solution.

21. A clear, autoclavable, flexible, sealed container having good water vapor barrier properties and flex crack resistance, said container being made of first and second plastic sheets sealed together at their peripheries, said first plastic sheet defining a formed bulge to increase the inside volume of said container and comprising a laminate of (1) at least one layer of a polyolefin derived principally from at least one of propylene and ethylene, and being of semi-crystalline characteristic to exhibit low permeability to water vapor, bonded to (2) a blended layer consisting of essentially of 30 to 90 percent by weight of a block copolymer having thermoplastic, rubbery characteristics, and having rubbery polyolefin blocks consisting essentially of ethylene and butylene units and blocks of a polystyrene; the rubbery polyolefin blocks comprising from 60 to 85 percent by weight of said block copolymer; and from 10 to 70 percent by weight of a polyolefin derived principally from at least one of propylene, ethylene, and 4-methylpentene-1, said polyolefin having a Vicat Softening Temperature of above 120° C.; said second plastic sheet comprising a bonded laminate comprising a layer of plastic material selected from the group consisting of relatively nonoriented polypropylene and polyethylene, and a layer of biaxially oriented polyester to serve as structural support during heat sealing and as a water vapor barrier member, said nonoriented polypropylene being peripherally bonded to said layer of polyolefin of the first plastic sheet.

22. The sealed container of claim 21 which said second plastic sheet further includes a layer of metal foil for improved vapor barrier characteristics.

23. The method of enclosing an object into a clear, autoclavable, flexible, sealed container having good water vapor barrier properties and flex crack resistance, which comprises thermoforming a convex bulge into a first plastic sheet to increase the inside volume of the container to be formed, said first plastic sheet comprising a laminate of (1) at least one layer of a polyolefin derived principally from propylene, and being of semi-crystalline characteristic to exhibit a low permeability to water vapor, bonded to (2) a blended layer consisting essentially of 30 to 90 percent by weight of a block copolymer having thermoplastic, rubbery characteristics, and having rubbery saturated polyolefin blocks and blocks of a polystyrene; the rubbery polyolefin blocks comprising from 60 to 85 percent by weight of said block copolymer; and from 10 to 70 percent by weight of a polyolefin derived principally from at least one of propylene, ethylene, and 4-methylpentene-1, said polyolefin having a Vicat Softening Temperature of above 120° C.;

placing said object into the convex bulge defined by the thermoformed plastic sheet;

and overlaying said first plastic sheet and said object with a second plastic sheet comprising a bonded laminate comprising a layer of relatively nonoriented polypropylene and a layer of biaxially oriented polypropylene, and peripherally heat sealing said first and second layers together about said convex bulge and object to form a sealed container.

24. A clear, autoclavable, flexible, sealed container having good water vapor barrier properties and flex crack resistance, said container being made of first and second plastic sheets sealed together at their peripheries, said first plastic sheet comprising a laminate of (1) at least one layer of a polyolefin derived principally from propylene, and being of semi-crystalline characteristic to exhibit a low permeability to water vapor, bonded to (2) a blended layer consisting essentially of 30 to 90 percent by weight of a block copolymer having thermoplastic, rubbery characteristics, and having saturated rubbery polyolefin blocks and blocks of a polystyrene; the rubbery polyolefin blocks comprising from 60 to 85 percent by weight of said block copolymer; and from 10 to 70 percent by weight of a polyolefin derived principally from at least one of propylene, ethylene, and 4-methylpentene-1, said polyolefin having a Vicat Softening Temperature of above 120° C.; said second plastic sheet comprising a bonded laminate comprising a layer of relatively nonoriented polypropylene and a layer of biaxially oriented polypropylene, said nonoriented polypropylene being peripherally bonded to said layer of polyolefin of the first plastic sheet.

25. The container of claim 1 in which said first plastic sheet defines a formed bulge to increase the inside volume of said container.

* * * * *